(12) United States Patent
Prochazka, Jr. et al.

(10) Patent No.: US 9,401,510 B2
(45) Date of Patent: Jul. 26, 2016

(54) LITHIUM ACCUMULATOR

(75) Inventors: Jan Prochazka, Jr., Kamenne Zehrovice (CZ); Jaroslav Polivka, Prague (CZ); Jiri Postler, Lodenice (CZ)

(73) Assignee: HE3DA s.r.o., Prague (CZ)

( * ) Notice: Subject to any disclaimer, the term of this patent is extended or adjusted under 35 U.S.C. 154(b) by 113 days.

(21) Appl. No.: 14/130,364

(22) PCT Filed: Jun. 26, 2012

(86) PCT No.: PCT/IB2012/053231
§ 371 (c)(1),
(2), (4) Date: Jan. 17, 2014

(87) PCT Pub. No.: WO2013/005135
PCT Pub. Date: Jan. 10, 2013

(65) Prior Publication Data
US 2015/0086848 A1  Mar. 26, 2015

(30) Foreign Application Priority Data
Jul. 1, 2011 (CZ) ................ PV 2011-405

(51) Int. Cl.
| | |
|---|---|
| *H01M 10/04* | (2006.01) |
| *H01M 10/0525* | (2010.01) |
| *H01M 10/0585* | (2010.01) |
| *H01M 2/02* | (2006.01) |
| *H01M 2/16* | (2006.01) |

(Continued)

(52) U.S. Cl.
CPC ............ *H01M 4/75* (2013.01); *H01M 2/0202* (2013.01); *H01M 2/1613* (2013.01); *H01M 2/1646* (2013.01); *H01M 2/1653* (2013.01); *H01M 4/043* (2013.01); *H01M 4/13* (2013.01); *H01M 4/139* (2013.01); *H01M 4/485* (2013.01); *H01M 4/505* (2013.01); *H01M 4/525* (2013.01); *H01M 4/583* (2013.01); *H01M 4/624* (2013.01); *H01M 4/74* (2013.01); *H01M 10/0413* (2013.01); *H01M 10/05* (2013.01); *H01M 10/0525* (2013.01); *H01M 10/0585* (2013.01); *H01M 4/1391* (2013.01); *H01M 4/1393* (2013.01); *H01M 4/1397* (2013.01); *H01M 2004/021* (2013.01); *H01M 2220/30* (2013.01); *Y02E 60/122* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

| 6,080,357 A * | 6/2000 | Sugikawa .................. 419/2 |
| 6,371,997 B1 | 4/2002 | Chang et al. |

(Continued)

FOREIGN PATENT DOCUMENTS

| EP | 1 777 761 A2 | 4/2007 |
| JP | 2000-090922 A | 3/2000 |

(Continued)

OTHER PUBLICATIONS

International Search Report of PCT/IB2012/053231, mailed Oct. 11, 2012.

*Primary Examiner* — Gregg Cantelmo
(74) *Attorney, Agent, or Firm* — Collard & Roe, P.C.

(57) ABSTRACT

A lithium accumulator with a housing includes at least one cell with two electrodes provided with current collectors and separated by a separator. Each electrode, free of organic binders, is pressed down onto both sides of the current collector made of a perforated metal strip in the form of metal network, expanded metal or perforated metallic foil. The minimum thickness of the electrodes is three times the thickness of the perforated metal strip.

4 Claims, 4 Drawing Sheets

(51) Int. Cl.
*H01M 4/75* (2006.01)
*H01M 4/04* (2006.01)
*H01M 4/13* (2010.01)
*H01M 4/139* (2010.01)
*H01M 4/1391* (2010.01)
*H01M 4/485* (2010.01)
*H01M 4/505* (2010.01)
*H01M 4/525* (2010.01)
*H01M 4/58* (2010.01)
*H01M 4/583* (2010.01)
*H01M 4/64* (2006.01)
*H01M 4/70* (2006.01)
*H01M 4/72* (2006.01)
*H01M 4/62* (2006.01)
*H01M 4/74* (2006.01)
*H01M 10/05* (2010.01)
*H01M 4/1393* (2010.01)
*H01M 4/1397* (2010.01)
*H01M 4/02* (2006.01)

(56) References Cited

U.S. PATENT DOCUMENTS

| | | | |
|---|---|---|---|
| 7,722,992 B1 * | 5/2010 | Zayatz | 429/233 |
| 2002/0146620 A1 * | 10/2002 | Connell | 429/161 |
| 2006/0281004 A1 * | 12/2006 | Yata | H01M 2/0207 429/162 |
| 2007/0218356 A1 * | 9/2007 | Kawamura et al. | 429/209 |
| 2008/0038638 A1 | 2/2008 | Zhang et al. | |
| 2009/0042099 A1 * | 2/2009 | Tatematsu et al. | 429/210 |
| 2009/0233164 A1 * | 9/2009 | Shimamura et al. | 429/149 |
| 2010/0119940 A1 * | 5/2010 | Okano | H01M 4/661 429/212 |
| 2011/0123868 A1 | 5/2011 | Kawaoka et al. | |

FOREIGN PATENT DOCUMENTS

| | | |
|---|---|---|
| WO | 2007/114311 A1 | 10/2007 |
| WO | 2010/031363 A1 | 3/2010 |

* cited by examiner

LITHIUM ACCUMULATOR

CROSS REFERENCE TO RELATED APPLICATIONS

This application is the National Stage of PCT/IB2012/053231 filed on Jun. 26, 2012, which claims priority under 35 U.S.C. §119 Czech Republic Application No. PV 2011-405 filed on Jul. 1, 2011, the disclosures of which are incorporated by reference. The international application under PCT article 21 (2) was published in English.

TECHNICAL FIELD

The invention relates to a lithium accumulator with a housing comprising at least one cell with two electrodes provided with current collectors and separated by a separator.

BACKGROUND ART

Lithium cells have been subject to intensive development efforts during the last two decades, and enabled existence of many portable devices. The increased demand for higher capacity and safety of lithium accumulators is now a limiting factor in development of many applications including the replacement of lead-acid accumulators for lithium accumulators with higher voltage in automobiles, or large accumulators for electromobiles.

Main part of currently produced rechargeable lithium accumulators are based on thin film electrodes where a mixture of active materials, conductive carbon and organic binders is sprayed or laminated in a thin layer onto a foil of conductive material, usually aluminum or copper, functioning as current collector. The thickness of such planar electrodes usually ranges from several microns to one hundred microns. The positive and negative electrodes are stacked up and separated from each other by a thin intermediate layer consisting of an electrically non-conducting material, typically a perforated foil of an organic polymer-separator. The stacked electrodes separated by separators are subsequently pressed down, closed into a case and the free space is filled up by electrolyte. A non-aqueous solution of lithium salts is frequently used for electrolyte.

The object of EP1777761A2 offers a solution, which is to increase the safety of thin film planar accumulator at higher temperatures by means of two separator layers, whereby one layer is constituted of electrolyte salt, binder and an organic powder (1-40 m m) and the second layer comprises a ceramic powder (5-30 m m). The thickness of electrodes is only several microns and the solution thereof does not enable further reduction of the amount of separators, thus increasing both the volume and the capacity of accumulator cells.

US2008038638A1 a JP2000090922 disclose the formation of a composite matrix having a defined porosity and capable to intercalate lithium, whereby such matrix is composed of particles able to form lithium alloys and an inactive material (covalent inorganic compounds).

PCT application WO2010031363 presents a lithium accumulator consisting either of a shell in which the mutually isolated electrodes are pressed into, or of a stack of metal frames arranged above each other, where each frame comprises an orifice, in which a thick-walled, so called three dimensional (3D) electrode is placed. The electrodes of opposite polarity are separated by separators and the frames of opposite polarity are insulated from each other. The electrodes have spatially distributed electron conductive component with a homogenously mixed active material capable to absorb and release lithium in the presence of electrolyte. The lithium accumulator is prepared by successive compressing a first electrode layer, separator and the second electrode, whereupon the housing is filled up by electrolyte, closed and the poles of the identical electrodes are interconnected. The accumulators of higher capacity comprise additional current collectors between the sandwich electrodes. The described electrode composition, arrangement and preparation thereof are well suitable for 3D electrodes, which enable the accumulator to achieve high volumetric capacity. Nevertheless, this advantage is accompanied by a longer charging period and also by increased volume and weight of the accumulator and decreased active area on account of frames.

DISCLOSURE OF INVENTION

Technical Problem

The primary object of the invention is to provide a lithium accumulator incorporating the advantages of the aforesaid pressed down 3D electrodes comprising an electron conductive component and active material with the advantages of electrodes with reduced charging and discharging periods, while preserving high capacity of the accumulator cell. Another object of the invention is to provide a structure of the electrodes which could enable an effective production thereof by press-compacting or rolling.

SOLUTION TO PROBLEM

Technical Solution

The object of this invention can be achieved and the described deficiencies overcome by a lithium accumulator with a housing comprising at least one cell with two electrodes provided with current collectors and separated by a separator, whereby each electrode, free of organic binders is pressed down on both sides of the current collector made of a perforated metal strip in the form of metal network, expanded metal or perforated metallic foil. Unlike with the known techniques, the individual electrodes or cells are not applied on the foils with binders. The electrodes are pressed directly, and free of organic binders, into the apertures of the perforated metal strip of the current collector without using a system of frames.

Hereinafter, other advantageous embodiments of the accumulator according to the invention are described that further develop or specify in more details its essential features, but without limiting the scope of the invention.

The cells are tightened up between two marginal covers mutually connected by bolts.

The minimum thickness of the electrodes is three times the thickness of the perforated metal strip. Advantageously, the perforated metal strip is 30-500 μm thick and is provided with a projection contact on one of its edges.

At least one electrode is formed of a spatially distributed electron conductive component mixed and compressed with an active material, free of organic binders, and having a morphology of hollow spheres with a wall thickness of maximum 10 micrometers, or morphology of aggregates or agglomerates of maximum 30 micrometers in size and porosity from 25 to 95%. Advantageously, the electron conductive component is present in the form of conductive compressable carbon. Such carbon modification may be compressed to form solid tablets and also a compact layer on both sides of the current collector—expanded metal and is capable to keep the desired electrode shape when the cells are assembled.

The active material is elected from the group of compounds capable to rapidly intercalate lithium, advantageously of a group consisting of mixed oxides or phosphates of lithium, manganese, chrome, vanadium, titanium, cobalt, aluminum, nickel, iron, lanthanum, niobium, boron, cerium, tantalum, tin, magnesium, yttrium and zirconium. Such materials are preferably present in nano-size particles that may reduce the time for lithium intercalation process to few seconds.

The second, negative electrode may be composed of graphite and electron conductive carbon and pressed down to form the electrode layer.

Alternatively, the second electrode may be composed of lithium titanium oxide or another material with the electric potential against lithium lower than the first electrode and electron conductive carbon. Accordingly, graphite may be replaced by another active compound with the electric potential against lithium lower than the cathode, typically under 2 V. A pure active material is used, when it is electrically conductive.

The separator may preferably have a non-directional morphology of a pyrolyzed product or nonwoven glass or ceramic fibers with an open type of porosity, and may be made by compressing the powder of a pyrolyzed product or ceramic nonwoven fibers into a bulk layer. The thickness of the separator is ranging from 0.1 mm to 10 mm and the separator can be created by compressing the powder directly onto the electrode, or it can be separately pressed into a sheet, often a tablet, optionally thermally treated, and then placed onto the electrode.

ADVANTAGEOUS EFFECTS OF INVENTION

Advantageous Effects

The advantage of the separator according to the invention is its safety based on its total thermal stability and the fact that the material of electrode, free of organic binders, has significantly lower electric resistance and less volume of released heat in the process of accumulator charging and discharging. The absence of organic binders together with the inner electrode morphology provides for high mobility of lithium ions inside the electrode. The described structure of electrodes and composition of its materials enables to achieve reduced charging and discharging periods and high volume capacity of accumulators even when conventional types of separators are used.

Another advantage of the accumulator according to the invention resides in the possibility to produce electrodes by press-compacting or rolling. This technology substitutes a rather complicated process of laminating electrodes on the current collector or even a simple pressing down the electrode material into the metallic frames. The fixing of individual accumulator cells between the multi-functional marginal covers provides the accumulator mechanical and vibration resistance, effective heat exchange through the covers, optimal current collection from individual electrodes and formation of one pole of the accumulator.

BRIEF DESCRIPTION OF DRAWINGS

Description of Drawings

Figure 1:
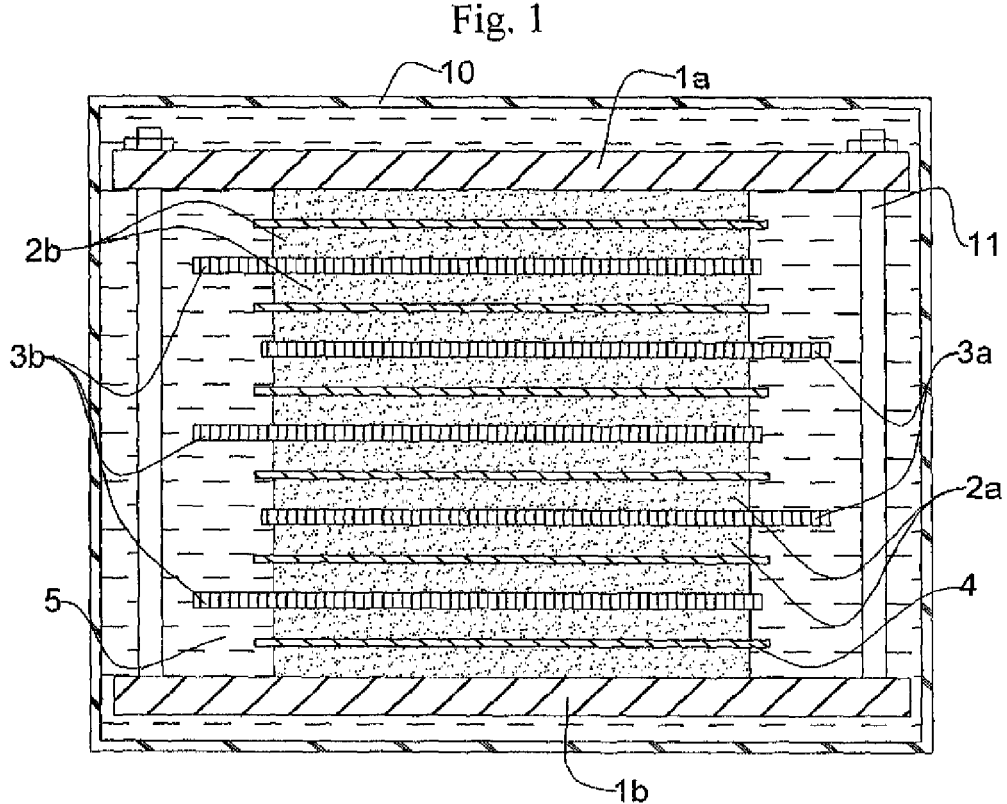
Figure 2:
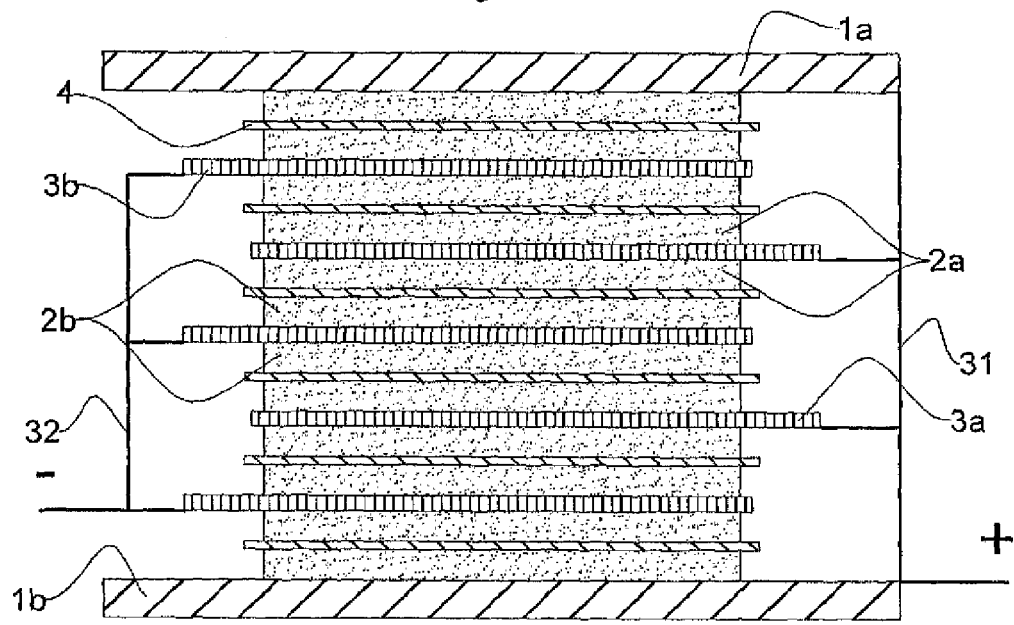
Figures 3, 3A:
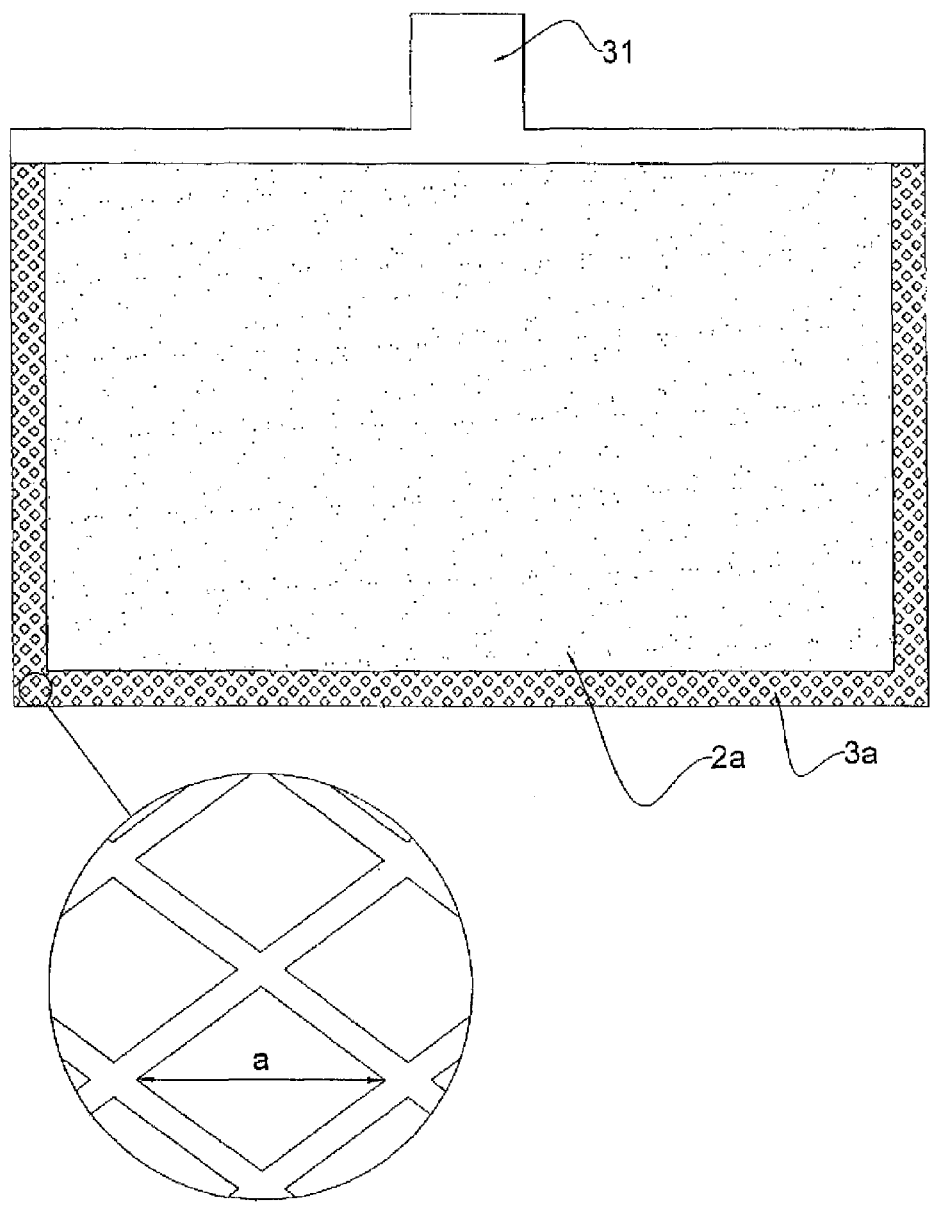
Figure 4:
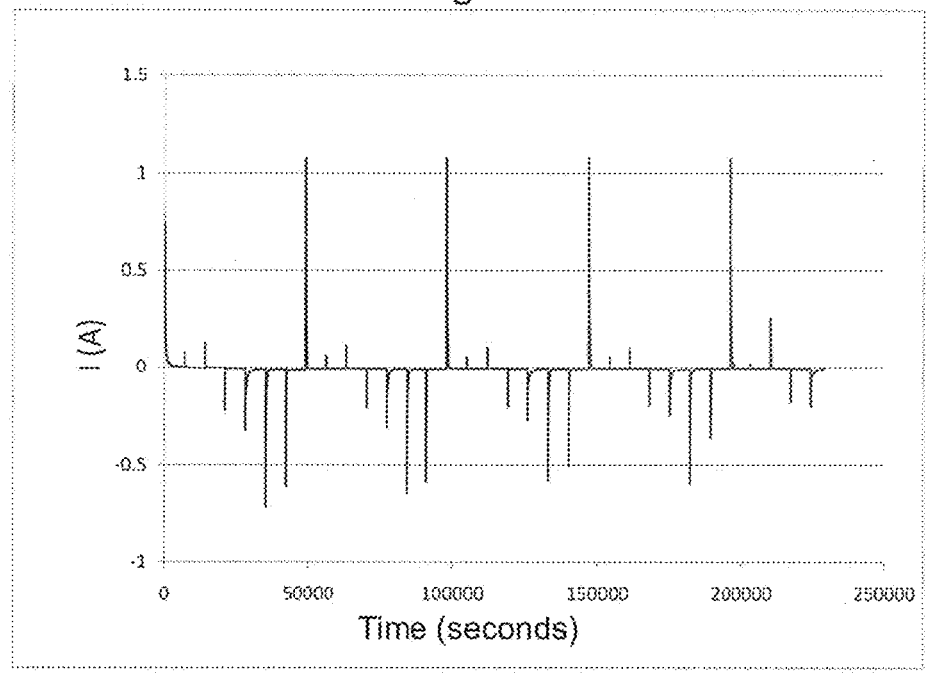
Figure 5:
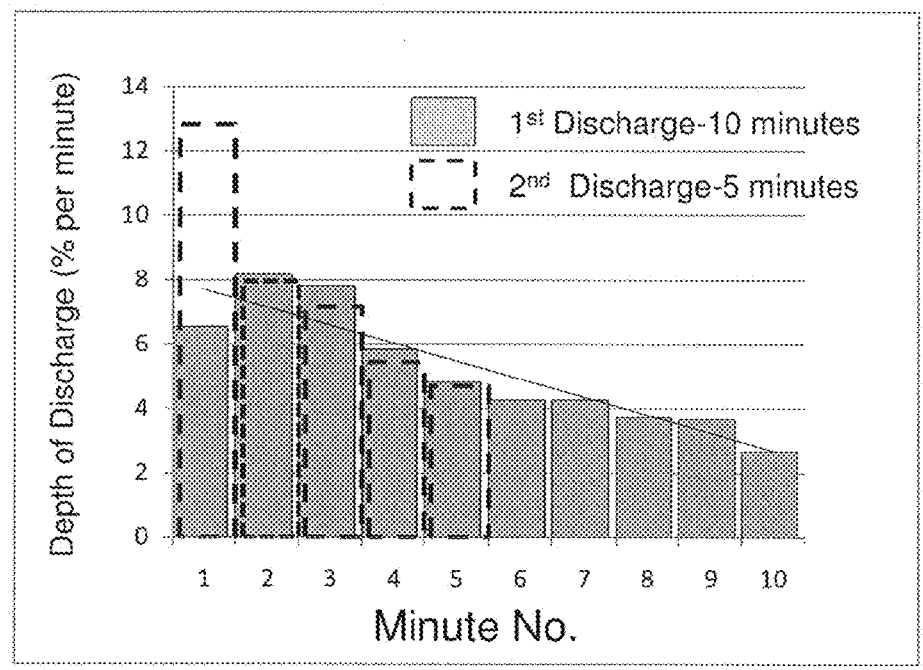
Figure 6:
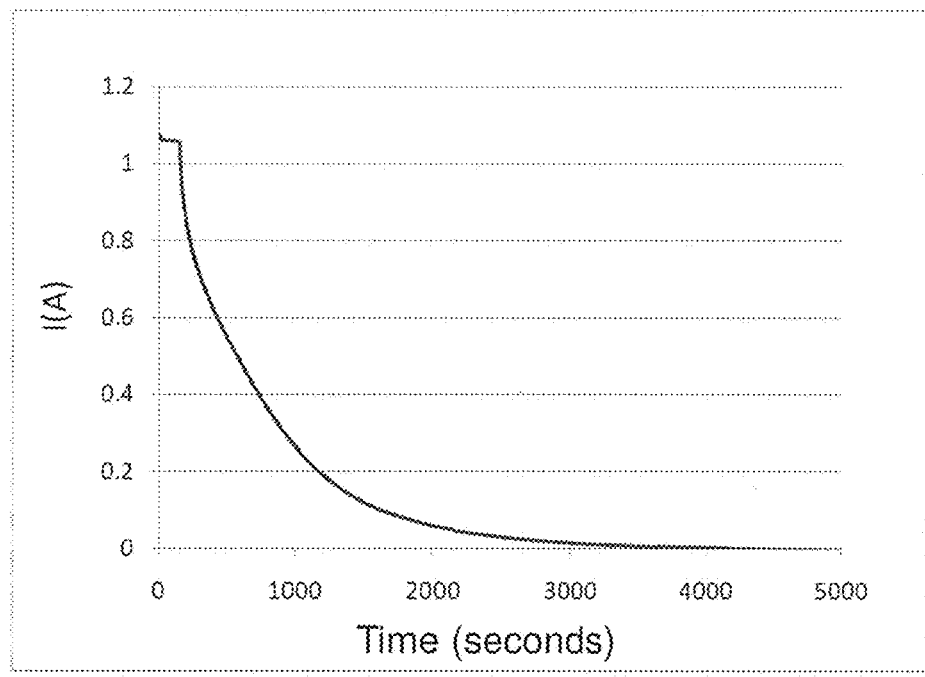
Figure 7:
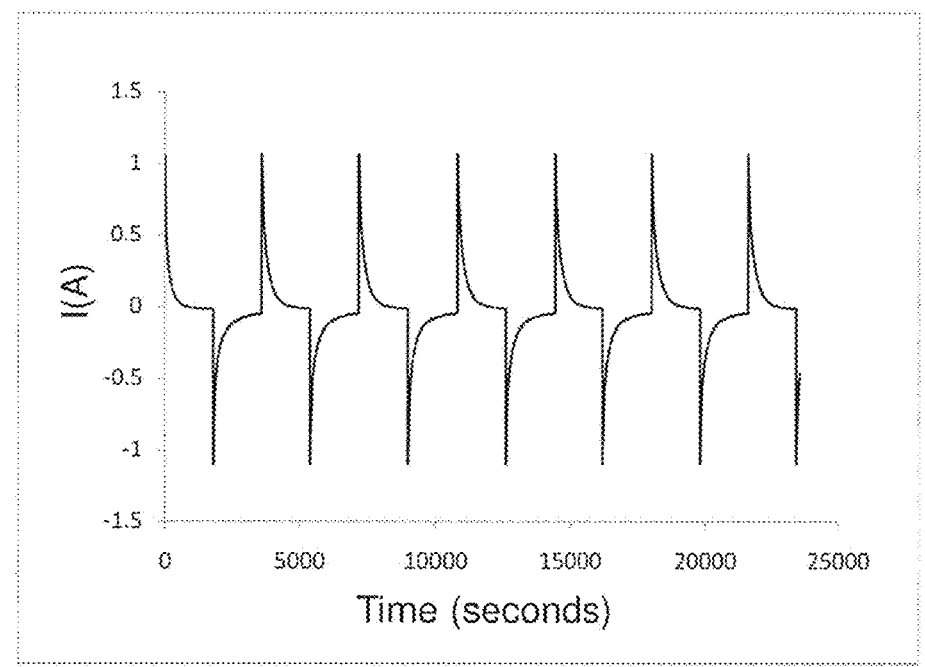

Certain of the possible embodiments of the invention are further described by way of examples with reference to the related schematic drawings. In the drawings:

FIG. 1 is a front sectional view of an accumulator;
FIG. 2 shows the electrode wiring system of the accumulator in FIG. 1;
FIG. 3 is a plan view of current collectors with an electrode;
FIG. 3a is a detailed view of a current collector;
FIG. 4 is a graph showing the charge and discharge characteristics with changes of voltage in steps;
FIG. 5 is a graph showing the discharge characteristics of an accumulator;
FIG. 6 is a graph showing the charge characteristics of an accumulator under constant voltage;
FIG. 7 is a graph showing the cyclic stability of an accumulator.

MODE FOR THE INVENTION

Mode for Invention

EXAMPLE 1

The accumulator illustrated by way of schematic sectional view in FIG. 1 comprises a housing 10 in which individual accumulator cells are arranged above each other at the stack between marginal covers 1a, 1b. The accumulator cells are tightened up together by bolts 11. Each cell consist of one positive electrode 2a, one negative electrode 2b and a separator 4 located between the electrodes. Each positive electrode 2a is pressed into a current corrector 3a and each negative electrode 2b into the current collector 3b. The material of each electrode, free of organic binders, is pressed in the current collector without any frame but with certain overhang to leave electrode extend above and under the collector surface in a way that the minimum distance between the opposite external electrode surfaces is equal to at least three times the thickness of the current collectors 3a, 3b.

The internal space of the accumulator housing 10 and the pores of electrodes and separators are filled up with electrolyte 5. The current collectors 3a, 3b are made of a strip of metal network, expanded metal or perforated metallic foil. The mutual connection of the current collectors 3a 3b and their respective accumulator poles '+' and '−' appears from FIG. 2.

FIG. 3 shows an example of a current collector 3a with a packed in electrode 2a. The current collector 3a is made of a strip of expanded aluminum metal which is provided with a non-perforated narrow tape on one side having a projection 31 to form a contact to wirings 31, 32 for connection to the respective accumulator poles. The expanded metal strip of the current collector 3b of the same size and shape is made of copper. The maximum size of the expanded metal aperture characterized by the leading diagonal 'a' as illustrated in detail in FIG. 3a, is 1.3 mm. The various compositions and parameters of electrodes and separators of accumulator cells according to example 1 are described in the following examples.

EXAMPLE 2

The lithium accumulator is composed of 13 negative electrodes 2b and 14 positive electrodes 2a separated by separators 4 from each other. Each electrode has an area of 2×25 mm and thickness of 0.3 to 0.35 mm. The positive electrodes are composed of a mixture of 80% by weight of LiFePO$_4$(Life Power®-P2 (LFP)) having a morphology of small aggregates of typical size under 2 μm with LFP particles of about 200 nm and further of 10 wt % of electron conductive carbon and 10 wt % of conductive compressible carbon with binding properties when compressed. This type of carbon, distributed under the trade name Ketjen Black EC-300J, has a specific surface area 800 m$^2$/g, specific pore volume 310-345 ml/100 g, agglomerate size mostly above 150 nm and the density of 125-145 kg/m$^3$ Alternatively, carbons distributed under the trade names EC-600JD a EC-330JMA may be used. The carbon is pressed down under the pressure of about 25 kN/cm$^2$ on an expanded aluminum metal current collector, 0.04 mm thick, with the maximum aperture size 'a' 1.3 mm. Alternatively, a carbon distributed under the trade name EC-600JD and EC-330JMA was used.

The metal strip network is provided with projection 31 on one side for mutual connection of electrodes and forming together an integrated positive pole. The total amount of the compressed mixture is 2.8 g and includes 2.24 g of active LFP material.

The second, negative electrodes are formed of a 2.6 g mixture composed of 15 wt % of electron conductive carbon, Super P-Li, distributed by the firm Timcal, and 85 wt % of graphite having morphology of rounded aggregates (Potatoe Graphite—also from Timcal). The mixture was pressed down onto the current collector made of 0.05 mm thick expanded cooper metal having a maximum aperture size 'a' of 2 mm. The network was also provided with projection 31 for interconnection of electrodes and forming an integrated negative pole. The graphite was added in 50% surplus.

The electrodes are separated by separators made of polyolefine porous foil having a thickness of 30 μm. The electrodes with the interposed separators are tightened up between two aluminum covers 1a, 1b which covers form the pole of the marginal positive electrodes and simultaneously the positive pole of the whole cell.

The accumulator cell with a formal voltage of 3.3 V was filled up with electrolyte 1M LiPF$_6$+EC/DME (1 mole of LiPF$_6$ in ethylene carbonate-dimethyl carbonate) and electrochemically cycled at controlled potential steps. The graph in FIG. 4 shows the charging period at constant voltage and discharging period in several (four) potential steps in the following sequences: charging 3.6 V→3.8 V→4.1 V and discharging 3.5 V→3 V→2.5 V→2 V.

The specific capacity of the whole accumulator module was 280 Wh/liter. After several tenth of cycles, when a transition layer (SEI) was formed on the graphite surface, the module was completely charged and subsequently discharged by a low resistance circuit. The 52 percent of accumulator capacity were discharged in the course of 10 minutes, while its temperature was increased not more than by 0.5 C. Upon repeated charging and a low resistance circuit discharging, 38 percent of the accumulator capacity was discharged in the course of 5 minutes, as shown in FIG. 5.

EXAMPLE 3

The lithium accumulator is composed of 12 negative electrodes 2b and 13 positive electrodes 2a separated by separators 4 from each other. The separators were prepared from a mixture of ceramic powder Al$_2$O$_3$ and glass fibers having a thickness of 80 μm. The active material of the positive electrode was LiCo$_{1/3}$Mn$_{1/3}$Ni$_{1/3}$O$_2$(NMC) and the active material of the negative electrode was Li$_4$Ti$_5$O$_{12}$(LTS) in the form of nano-particles. The area of each electrode was 2×25 mm and its thickness 0.3–0.35 mm. The volume of the accumulator module was 3.25 cm$^3$ and its specific capacity 162 Wh/liter.

The positive electrodes were composed of a mixture of 80 wt % NMC with the morphology of hollow spheres, sized under 40 μm, having a typical wall thickness under 5 μm and an average NMC particle size 250 nm, and further of 20 wt % of electron conductive carbon. The mixture was pressed down like in Example 2 on a 0.05 mm thick current collector—expanded aluminum metal, having the maximum aperture size 'a' 2 mm. The 60% surplus of NMC material of the positive electrode was used in combination with LTS, which, when present in a lesser amount than stochiometric, is capable to easily control the charging and discharging process in such a manner that no overcharge of the accumulator can occur. The total amount of the pressed down mixture was 2.6 g and comprised 2.08 g of active NMC material.

The negative electrodes were composed of 2.04 g mixture of 21 wt % of electron conductive carbon, 20 wt % of compressible carbon (Ketjen Black 300J) and 59 wt % of nanoparticles Li$_4$Ti$_5$O$_{12}$ The mixture was pressed onto a current collector made of a 0.05 mm thick expanded copper metal having a maximum aperture size 'a' of 2 mm. The current collectors were also provided with projections 31 for interconnection of electrodes. The amount of LTS was equal to 60% of NMC capacity, what resulted in a lesser capacity of 210 mAh when compared with the stechiometric capacity of 333 mAh. The accumulator formal voltage was 2.5 V.

The electrodes separated by separators were tightened up between two aluminum covers 1a, 1b whereby the covers formed the positive pole of the whole cell and simultaneously of the pole of the marginal positive electrodes. After overnight soaking of the accumulator cell with the electrolyte 1M LiPF$_6$v EC-DMC the accumulator cell has been fully charged at a constant voltage of 2.9 V. As appears from FIG. 6, the cell was charged to 77% of its total capacity after 900 seconds, and to more than 96% of its total capacity after 1800 sec.

Further, the accumulator was cycled in 1800 sec intervals at 2.7 V for charging and at 2.4 V on discharging. The history of the current characteristics is shown in FIG. 7 and demonstrates excellent cycling stability of the accumulator.

INDUSTRIAL APPLICABILITY

The accumulator according to the invention may be used in production of lithium accumulators capable to work at high temperatures above 100 C. The accumulator is suitable for replacing today's lead-acid accumulators with a higher voltage systems, namely in the automotive industry, for the handheld electrical tools and portable electrical and electronic appliances and devices.

The invention claimed is:

1. A frameless lithium accumulator comprising:
a plurality of accumulator cells arranged above each other at a stack and tightened up between two marginal covers, each cell of the plurality of accumulator cells comprising:
a first current collector and a second current collector each having a first side and an opposite second side and being made of a perforated metal strip in the form of a metal network, expanded metal or a perforated metallic foil, having a thickness of 30 μm to 500 μm;
a positive electrode free of organic binders and composed of a spatially distributed electron conductive component mixed with an active material; wherein the active material has the morphology of hollow spheres with a wall thickness of maximum 10 micrometers or has the morphology of aggregates or agglomerates of maximum size of 30 micrometers and porosity from 25 to 95%; and wherein the positive electrode is pressed directly down into apertures of the perforated metal strip on the first side and on the second side of the first current collector without using a system of frames;

a negative electrode free of organic binders and selected from the group of materials consisting of graphite and electron conductive carbon, lithium titanium oxide and electron conductive carbon, or a material having a electric potential towards lithium lower than the positive electrode and electron conductive carbon; wherein the negative electrode is pressed directly down into apertures of the perforated metal strip on the first side and on the second side of the second current collector without using a system of frames;

a separator located between the positive electrode and the negative electrode;

a housing for receiving the plurality of accumulator cells; and an electrolyte composed of a solution of lithium salt in an organic solvent;

wherein the minimum thickness of the electrodes is three times the thickness of the current collector made of the perforated metal strip.

2. The lithium accumulator of claim 1 wherein the spatially distributed electron conductive component is elected from the group consisting of conductive compressible carbon, conductive metals, electrically conductive oxides, metal carbides, and nitrides.

3. The lithium accumulator of claim 1 wherein the active material is selected from the group consisting of compounds of mixed oxides or mixed phosphates of lithium, manganese, chrome, vanadium, titanium, cobalt, aluminum, nickel, iron, lanthanum, niobium, boron, cerium, tantalum, tin, magnesium, yttrium and zirconium.

4. The lithium accumulator of claim 1 wherein the separator is a member selected from the group of materials consisting of compressed inorganic ceramic materials $Al_2O_3$, $SiO_2$, glass, $ZrO_2$, and wherein the member is in the form of nano-fibers, fibers or organic porous foil.

* * * * *